13b
14b
16b
15
19
20
13a
14a
24
23a
16a
25
4.
12b
11
23b
10b
18
20b
9b
27
12a
6b
8b
22
23c
10a
5b
3b
7
17
21
9a
1b
2b
4.
6a
8a
5a
3a
1a
2a 63
64
66
69
61
72
68
70
73
65
71
67
57
56
58
55
53
54
39
37
38
36
35
40
71
61
62
59
42
41
34
43
48
46
50
45
44
60
47
49
51

United States Patent Office 3,370,162

Patented Feb. 20, 1968

3,370,162

DEVICES FOR AUTOMATICALLY ADJUSTING THE INCLINATION OF THE HEADLAMPS OF AN AUTOMOTIVE VEHICLE

Edmond Henry-Biabaud, Paris, France, assignor to Societe Anonyme Andre Citroen, Paris, France Filed June 15, 1965, Ser. No. 464,131
Claims priority, application France, June 18, 1964, 978,766
6 Claims. (Cl. 240—7.1)

ABSTRACT OF THE DISCLOSURE

A device for automatically adjusting the inclination of the lights of an automotive vehicle to compensate for differences in static and dynamic loads carried respectively for front and rear sets of wheels comprises an anti-roll bar associated with each set of wheels. The rotation of a central point of each of the anti-roll bars is proportional to the average vertical movements of the respective set of wheels. Arms on central portions of the roll bars are connected to means for tilting the headlights through an intermediate integrating device adapted to effect the algebraic addition of the effects produced by movements of the wheels of the two sets so as to lower the optical axes of the headlights in relation to the chassis when the level of the front set of wheels is raised with respect to the chassis and vice-versa and to raise the optical axes of the headlights in relation to the chassis when the level of the rear set of wheels is raised and vice-versa. The connections between the anti-roll bars and the headlight inclining means may be, e.g., mechanical or hydraulic. Preferably the connections include a lost motion device or a time lag element to smooth out any rapid or irregular movements caused by road conditions.

The inclination of the headlamps on an automotive vehicle is adjusted, of course, in relation to the plane supporting the vshicle, that is to say, in relation to the ground; this inclination, which should remain constant with respect to this plane, corresponds in relation to the vehicle to an angle varying as a function of the loads carried by the front and rear axles; if the static loads are modified this modification may be taken into account upon completion of the loading operation, before starting the journey; however, the same does not apply when the dynamic loads are altered, notably as a consequence of accelerations or decelerations of the vehicle, or road unevennesses.

It is the object of the present invention to provide a device adapted automatically to adjust the inclination of the headlamps of an automotive vehicle irrespective of the modifications brought in the loads supported by the two sets of wheels or axles of the vehicle, whether these loads are of static or dynamic nature.

To this end the device of this invention is so designed that the optical axis of the headlamps is raised in relation to the vehicle frame or chassis when the rear set of wheels is lowered in relation thereto, said axis being lowered when it is the front set of wheels that is lowered, these two actions taking place additionally and simultaneously. In other words, if the two sets of wheels are lowered or raised to the same extent the optical axis of the headlamps remains in the same angular position with respect to the vehicle and therefore to the ground or road surface, since the movement of the chassis is parallel to the ground or road surface. The terms "raised" and "lowered" as herein used with reference to the optical axis of the headlamps refers to an angular movement of the optical axis in an upward or downward direction respectively to change the angle of inclination of the optical axis of the headlamps relative to the longitudinal axis of the vehicle body or chassis.

The device according to this invention may be of mechanical, hydraulic, pneumatic, electrical character, or a combination of these types.

In all cases, it comprises a member controlling the inclination of the optical axis of the headlamps as a function of the vertical movement of the wheels of the front axle, a member acting in the opposite direction upon the inclination of the optical axis of the headlamps as a function of the vertical movement of the wheels of the rear axle, and an intermediate member providing an algebraic addition of the actions produced by these two members.

To this end a linkage system may be used wherein a longitudinal rod associated with the front axle controls the headlamp inclination directly, another longitudinal rod associated with the rear set of wheels controlling the longitudinal movements of said first rod by means of said intermediate member.

To enable each one of the two actions resulting from the movements of the front axle and rear axle respectively to control separately the headlamp inclination when the other set of wheels remains stationary, and to permit the algebraic addition of these two actions if they take place simultaneously, said intermediate member may consist of a pair of conjugate levers extending normally in a substantially vertical plane and pivoted the one to a fixed point of the chassis and the other to a point located at the end of a normally substantially vertical arm adapted to pivot as a function of the vertical movements of the set of front wheels, the front portion of the rod associated with the rear set of wheels being pivoted to the central portion of said other lever, the ends of said pair of conjugate levers being interconnected by a link.

As a substitute for the aforesaid linkage system a metal cable adapted to slide in a flexible sheath may be used for transmitting efforts in a manner known per se between spaced points, this cable being either pulled and causing the downward tilting of the headlamps in relation to the vehicle chassis when the set of rear wheels is raised with respect to the chassis, or compressed in the other alternative, to produce the opposite result, the front end of said cable being on the other hand either pulled for tilting the headlamps downwards in relation to the vehicle chassis when the set of front wheels is lowered, or compressed to produce the opposite result when this train of wheels is lowered.

Thus, changes in the height of each set of wheels produce the desired adjustment and in case of simultaneous changes, whether in one or the other direction, the device will provide an adjustment corresponding to the algebraic sum of the adjustments required by the changes occurring in both trains of wheels separately.

This result may be obtained by associating the two wheel-supporting arms of a same train or axle by means of a mechanical system such as a torsion bar, a train of gears, or any other suitab'e connecting means, and utilibing one point of this coupling which corresponds to the average stroke of each wheel-supporting arm for controlling the tractive or compressive movements applied to the aforesaid adjustment control cable or rod.

It was found that it was advantageous to leave a certain independence or lost-motion in the device with respect to the rapid and irregular beats of the axles as a consequence of road conditions; in this respect the device of this invention, whether of mechanical, hydraulic or other type, may be completed by means of a suitable time-lag element adapted to retard its response to rapid and irregular movements of the axles.

The attached drawings illustrate diagramamtically various forms of embodiment of the present invention given by way of example. In the drawings.

Figure 1:
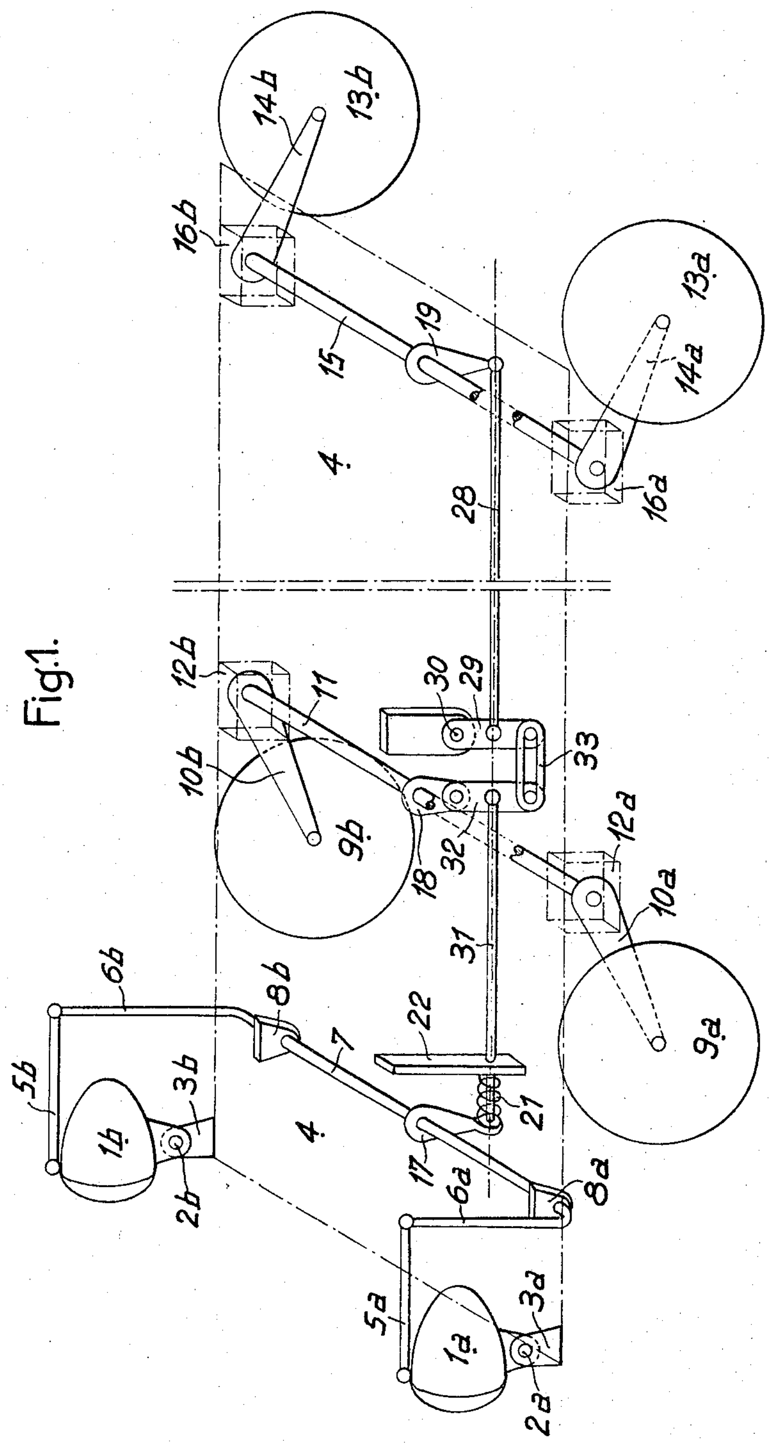
FIGURE 1 is a diagrammatic perspective view showing a first form of embodiment of the device for automatically tilting the headlamps of an automotive vehicle as a function of static and dynamic loads.

Referring first to the form of embodiment illustrated in FIGURE 1 of the drawings the headlamps 1*a* and 1*b* are pivotally mounted on pivot pins 2*a* and 2*b* of supports 3*a*, 3*b* carried by the vehicle 4; links 5*a*, 5*b* connect the upper portion of the headlamps 1*a*, 1*b* to the ends of corresponding side members 6*a*, 6*b* of a U-shaped lever 7 pivoted in supports 8*a*, 8*b* of the vehicle chassis.

The front wheels 9*a*, 9*b* are mounted on the outer ends of wheel support arms 10*a*, 10*b* rotatably rigid with the relevant ends of torsion bars 11 adapted to pivot in supports 12*a*, 12*b* provided to this end on the vehicle chassis 4.

The rear wheels 13*a*, 13*b* are also mounted on the ends of wheel-support arms 14*a*, 14*b* rotatably rigid with the corresponding ends of a torsion bar 15 pivotally mounted in supports 16*a*, 16*b* provided to this effect on the vehicle chassis 4.

The lever 7 and the central portion of the torsion bars 11 and 15 are rotatably rigid with arms 17, 18 and 19.

The rod 28 associated with the rear train of wheels 13*a*, 14*a* has its rear end pivoted to the end of arm 19 and its front end pivoted to the intermediate portion of a lever 29 pivotally attached in turn to a fixed point 30 of the chassis; the other longitudinal rod 31 associated with the front train of wheels 9*a*, 9*b* has its rear end pivoted to the intermediate portion of a lever 32 pivoted in turn on the arm 18 and its front end pivoted to the end of the front lever 17; the ends of the aforesaid two arms 29 and 32 are interconnected by means of studs engaging a lost-motion link 33; a coil compression spring 21 bearing against a fixed element 22 of the chassis con-constantly urges the arm 17 in the direction causing the beam axis of the headlamps to be raised and the lever 32 in the direction causing the stud carried by the end of this lever 32 and the stud carried by the end of the other lever 29 constantly to engage the opposite ends of the slot of link 33.

This device operates as follows:

When for any reason the torsion bar 15 is lowered the wheel-carrier arms 14*a* and 14*b* are pivoted upwards and the arm 19 is rotated counterclockwise as seen in FIGURE 1, thus pulling the rod 28 and transmitting through the levers 29 and 32 a corresponding tractive movement to the arm 19, the side members 6*a* and 6*b* of U-shaped lever 7 pivoting in the opposite direction, whereby the links 5*a* and 5*b* will tilt the headlamps 1*a* and 1*b* about their pivot pins 2*a* and 2*b*, respectively, in the direction to increase the downward inclination of the optical axis of said headlamps in relation to the chassis.

On the other hand, when the level of torsion bar 11 is lowered as a consequence of the upward rotation of the carrier arms 10*a* and 10*b* of the front wheels 9*a* and 9*b*, the arm 18 is rotated in the clockwise direction and this movement is transmitted to the lever 32 engaging with the stud rigid with its lower end the bottom of the slot in the lost-motion link 33, thus causing the forward movement of rod 31 and therefore the rotation of arm 17 in the same direction as arm 18; under these conditions, the side members 6*a* and 6*b* of lever 7 are pivoted and as in the preceding case the headlamps 1*a* and 1*b* are pivoted in the opposite direction, thus raising their optical axis in relation to the chassis.

If the two movements take place simultaneously, and if they have the same angular amplitude, they cancel each other and therefore the headlamp inclination remains unchanged; if they take place in opposite directions, they add themselves to each other and the headlamp inclination is the sum of the angular movements due to each of them.

Figure 2:
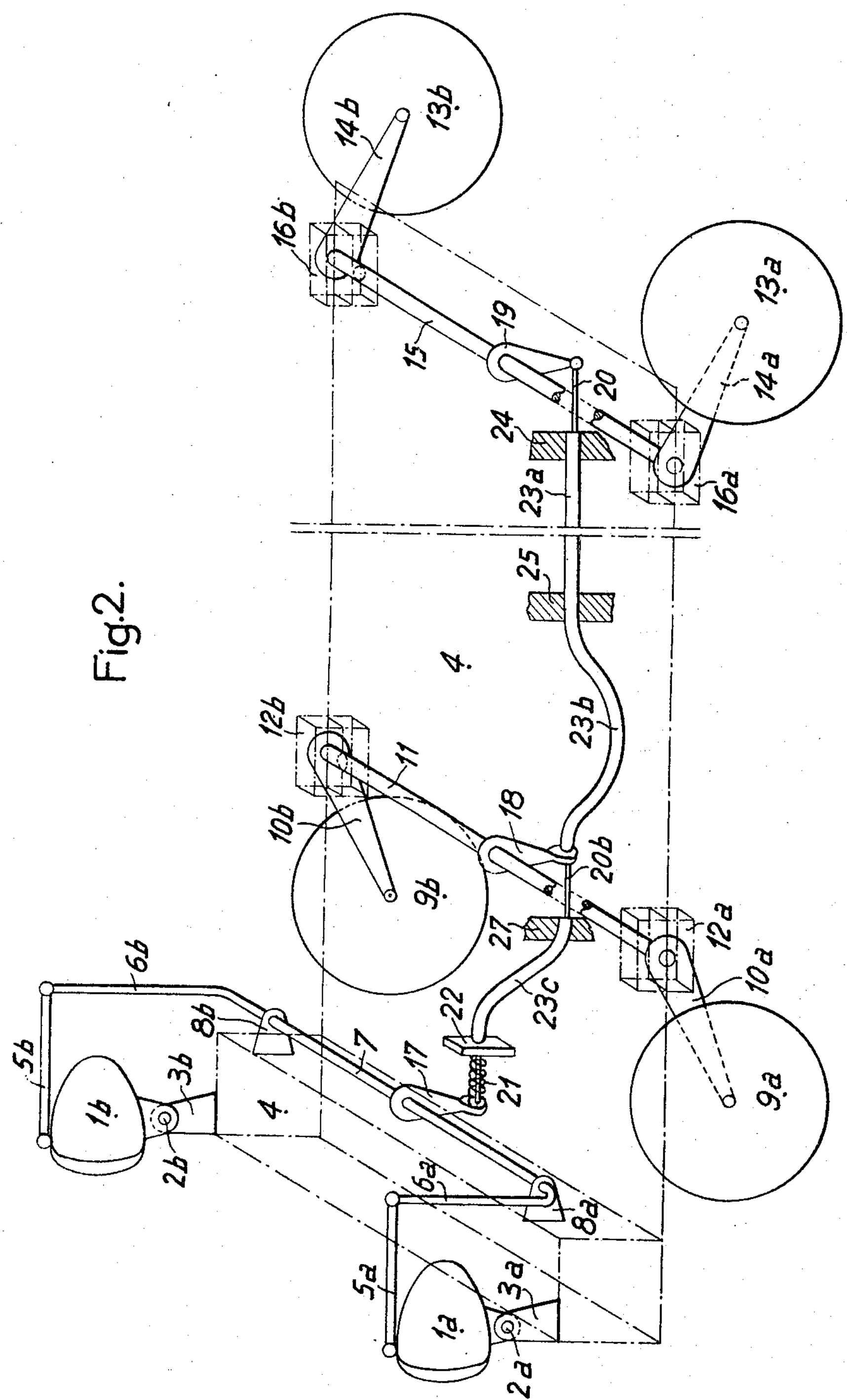
FIGURE 2 is a similar view of a modified form of embodiment of the device.

In the alternate form of embodiment illustrated in FIGURE 2, cables enclosed in flexible sheaths are substituted for the rigid rods of the preceding case for transmitting the motion between the arms 17, 18 and 19.

A sheath-covered metal cable 20 connects the arms 17 and 19 with each other and a spring 21 reacting on the fixed element 22 rigid with the chassis 4 constantly tensions the metal cable 20.

This cable is covered on the major portion of its length by a sheath and comprises a first sheath section having one portion 23*a* secured between its rear end 24 (in the vicinity of said arm 19) and a central point 25, and another portion 23*b* which is free between this fixation point 25 and the arm 18.

Another sheath section 23*c* is limited on one side by a fixation point 27 adjacent to the arm 18 and on the other side by the aforesaid fixed bearing element 22.

The operation of this arrangement will be readily understood:

When for any reason the torsion bar 15 is lowered the wheel-carrier arms 14*a*, 14*b* are pivoted upwards and the arm 19 is pivoted counterclockwise, thus tensioning the cable 20; consequently, the arm 17 rotates in the same direction as the arm 19 and the side members 6*a* and 6*b* of lever 7 are rotated in the counterclockwise direction, thus causing the links 5*a* and 5*b* to tilt the headlamps 1*a*, 1*b* about their pivot points 2*a* and 2*b* in the direction to increase their downward inclination in relation to the chassis of the vehicle.

On the other hand, if the torsion 11 is lowered as a consequence of an upward angular movement of the carrier arms 10*a* and 10*b* of front wheels 9*a* and 9*b*, thus causing the arm 18 to rotate forwards or clockwise, this forward rotation of arm 18 will carry along in the same direction the flexible sheath section 23*b* without causing the cable 20 to slide within this sheath section 23*b*; therefore, the length of the cable section 20*b* is reduced and due to the force of spring 21 the cable sliding in sheath section 23*c* will emerge to a corresponding extent from the support 22, thus causing the arm 17 to rotate in the same direction as the arm 18, and a corresponding rotation of the side members 6*a* and 6*b* of lever 7 in the opposite direction, as in the preceding case, to pivot the headlamps 1*a* and 1*b*, the optical axes of these headlamps being thus raised in relation to the chassis.

If both motions take place simultaneously, and if they have the same amplitude they cancel each other and the headlamp inclination remains unchanged.

Figures 3, 4:
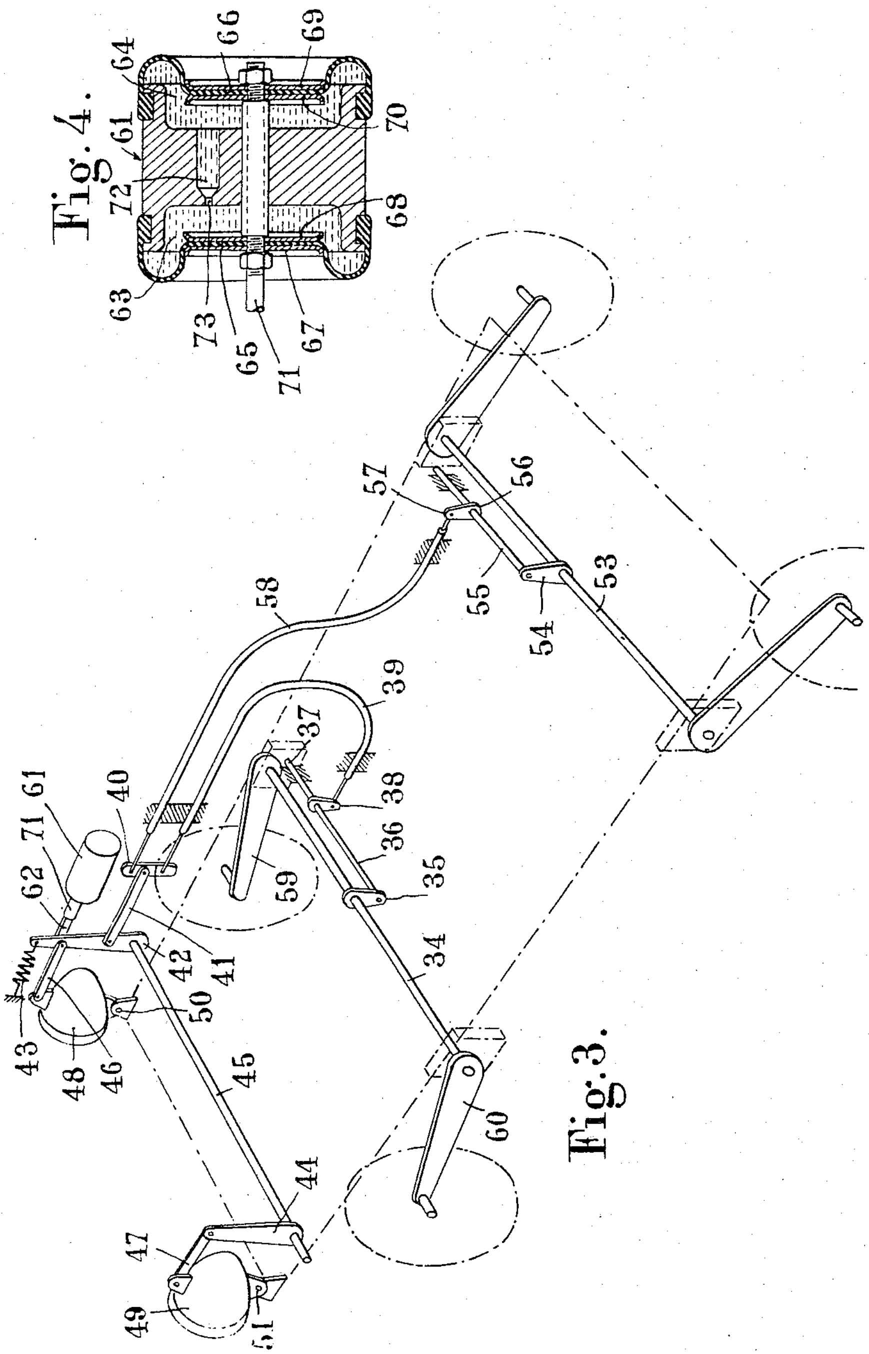
FIGURE 3 is a mechanical arrangement similar to the one illustrated in FIGURE 1 but completed by a time-lag device.
FIGURE 4 is an axial section showing on a larger scale the time-lag device of the system of FIGURE 3.

In the form of embodiment illustrated in FIGURE 3, there is wedged on the central portion of the anti-roll bar 34 of the front axle a small arm 35 having secured on its free end one end of an elastic rod 36 having its opposite end 37 wedged to the chassis of the vehicle.

An arm 38 wedged on said elastic rod 36 controls one end of a sheathed cable 39 having its other end secured to one end of a rudder bar 40. This rudder bar 40 is connected by means of a rod 41 to a lever42 constantly urged by a spring 43 and rigidly connected through a coupling rod 45 to a similar lever 44, these levers 42 and 44 controlling through links 46 and 47 the angular position of the headlamps 48, 49 pivotally mounted on pivot pins 50 and 51.

The anti-roll bar 53 of the rear axle comprises similarly in its central portion an arm 54 having attached on its free end one end of an elastic rod 55 of which the opposite end is rigidly anchored to the chassis; wedged in turn on this elastic rod 55 is an arm 56 having its free end 57 attached to one end of a sheathed cable 58 of which the opposite end is attached to another end of said rudder bar 40.

This arrangement operates substantially like the device illustrated in FIGURE 2, as follows:

When for any reason the anti-roll bar 34 is lowered the arms 59 and 60 carrying the front wheels are pivoted upwards and therefore a clockwise rotation is impressed to the anti-roll bar 34, to the elastic bar 36, and to the arm 38, whereby this arm 38 will pull the sheathed cable 39 to actuate through the rudder bar 40 the rod 41, thus rotating in the clockwise direction the lever 42, coupling rod 45 and lever 44, to cause the rotation of headlamps 48 and 49 through the medium of rods 46 and 47, in order to raise their optical axes in relation to the chassis 4 of the vehicle.

If, on the other hand, the anti-roll bar 34 is raised all the movements described in the preceding paragraph take place in the opposite direction.

A raising movement of the anti-roll bar 53 of the rear axle causes a pivotal motion of headlamps 48 and 49 in a direction opposite to that of the pivotal motion caused by the raising of the anti-roll bar 34 of the front axle.

The pivotal movements, whether caused by one and/or the other axle of the vehicle, are braked by the time-lag device 61 acting through the medium of the rod 62 and preventing the too rapid and irregular up- and downward movements of the front and rear axles, which are caused by road unevennesses, from producing undesired changes in the inclination of the headlamps 48 and 49.

To this end, the time-lag device may be constructed as shown in FIGURE 4; it comprises a central portion disposed between two chambers 63 and 64 filled with liquid and bounded on their outer ends by diaphragms 65 and 66 having their central portions clamped between pairs of cups 67, 68 on the one hand and 69, 70 on the other hand, these pairs of cups being rigidly interconnected by a rod 71 extending through the central portion of the time-lag device 61, this rod 71 being adapted to move bodily with the rod 62.

The communication between the chambers 63 and 64 takes place through a duct 72 provided with a jet 73.

The velocity at which all the component elements of the mechanism are moved is retarded by the permissible rate of flow of the liquid through said jet 73 from one to the other chamber.

Figures 5, 6, 7:
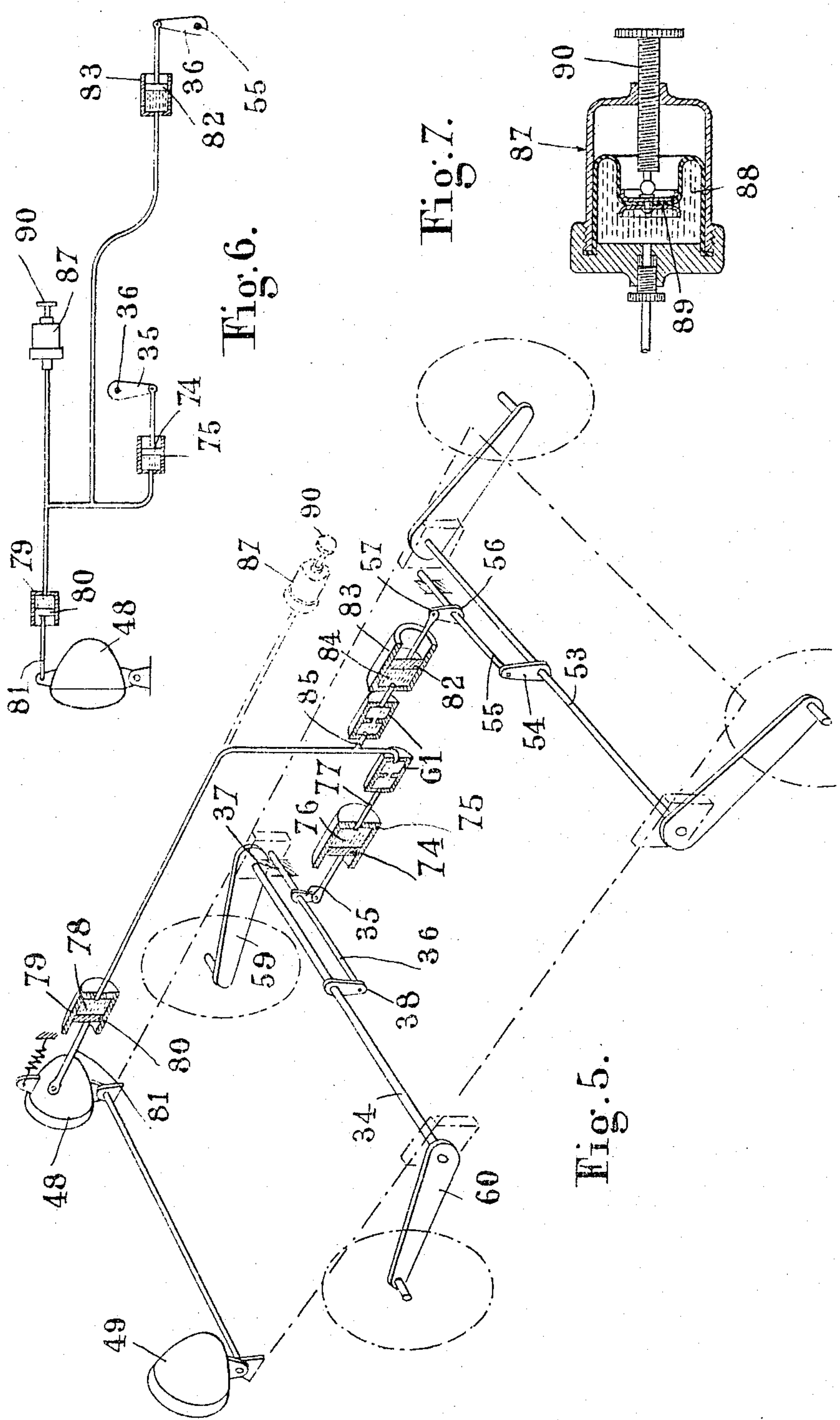
FIGURE 5 is another perspective view showing diagrammaticaly a hydraulic system also equipped with the time-lag device.
FIGURE 6 is a fragmentary view showing this mechanism completed by an initial hydraulic adjustment device.
FIGURE 7 shows in section an adjustment device.

In the specific form of embodiment illustrated in FIGURE 5 the same reference numerals designate corresponding elements, and the arm 38 wedged on the torsion bar 36 controls the movements of a piston 74 in a cylinder 75 having its chamber 76 connected through a pipe line 77 and a time-lag device 61 to the chamber 78 of another cylinder 79 having its piston 80 connected by means of a rod 81 to the headlamp 48. Similarly, the arm 56 wedged on the torsion bar 55 is connected to a piston 82 sliding in a cylinder 83 of which the chamber 84 is connected through a pipe line 85 and another time-lag device 61 to the chamber 78 of said cylinder 79.

This mechanism operates like the mechanism illustrated in FIGURE 3 and therefore a detailed description of its mode of operation is deemed unnecessary.

Whatever cares may be taken for preserving the fluid-tightness of a hydraulic assembly of the type just described, fluid leakages may occur which, even if of small value, may in the long while alter the initial adjustment; besides, even in the case of a perfectly tight system, temperature variations involve objectionable modifications in the initial setting.

To avoid this drawback the device may be completed by a compensator piston 87 connected to the main pipe line and having its chamber 88 bounded by a piston 89 of which the movements may be controlled at will by means of a screw 90 for increasing or decreasing at will the fluid content of the main pipe lines, for raising or lowering the headlamps.

Of course, the two forms of embodiment described hereinabove with reference to the attached drawings are given by way of example and should not be construed as limiting the present invention, since many modifications and variations may be brought thereto without departing from the spirit and scope of the invention as set forth in the appended claims.

What I claim is:

1. A device for automatically adjusting the inclination of the headlamps of an automotive vehicle in relation to the chassis of the vehicle carried by two sets of wheels, to compensate for modifications occurring in the loads supported by said two sets of wheels of the vehicle, whether said loads are of dynamic or static nature, comprising means mounting said headlamps for tilting relative to said chassis, means for tilting the headlamps, an anti-roll bar associated with each set of wheels, the rotation of a central portion of said anti-roll bar being proportional to the average vertical movements of the wheels of the respective set, a small arm fixed on the central portion of each anti-roll bar, an elastic rod having one end secured to the free end of each of said small arms and their other end secured to the chassis of the vehicle, another small arm fixed on each of said elastic rods intermediate its end and means connecting each of these last small arms to said headlamp tilting means to raise the optical axes of the headlamps in relation to said chassis when the front set of wheels is raised with respect to the chassis and vice-versa and to lower the optical axis of the headlamps in relation to the chassis when the rear set of wheels is raised and vice-versa, said connecting means including integrating means for algebraically adding the actions produced respectively by vertical movements of the front and rear sets of wheels.

2. A device according to claim 1 in which said integrating means consist of a pair of conjugate levers normally extending in a substantially vertical position and comprising a first lever swingable about a fixed point of said chassis as a function of the vertical movements of the rear set of wheels and a lever swingable about a point located at the end of a normally substantially vertical arm pivoting as a function of the vertical movements of the front set of wheels, the ends of said two conjugate levers being interconnected by a lost-motion link, said second lever controlling the inclination of the head lamps.

3. A device according to claim 1 in which said integrating means consist of a rudder bar, the inclination of which controls the inclination of the head lamps, and means whereby the front set of wheels inclines said rudder bar in one direction when it is raised, and vice-versa, and means whereby the rear set of wheels inclines said rudder bar in the same direction when it is lowered, and vice-versa.

4. A device according to claim 1 in which said first and second means consist of sheated cables.

5. A device according to claim 1, further comprising hydraulic time-lag means for retarding the response of the device to rapid and irregular movements of the vehicle axes.

6. A device for automatically adjusting the inclination of the headlamps of an automotive vehicle in relation to the chassis of the vehicle carried by two sets of wheels to compensate for modifications occurring in the loads supported by said two sets of wheels of the vehicle, whether said loads are of dynamic or static nature, comprising, an anti-roll bar for each set of wheels, an arm fixed on the central portion of each one of said anti-roll bars, two resilient rods each having one end secured to the end of one said arms and the other end secured to the frame of the automotive vehicle, two arms each rigid with the central portion of one of said resilient rods, a transverse axis about which the headlamps are pivotally mounted, links adapted when moved in their longitudinal direction to control the pivotal movements of said headlamps, levers each adapted when pivoted about their fulcrum to produce the movements of translation of said links, a rod adapted when moved in its longitudinal direction to pivot said last-named levers, a rudder having secured to its intermediate portion one end of said last-named rod of which the opposite end is adapted to control the pivotal movements of said last-named levers, a pair of sheathed cables having their sheath ends attached to said frame and the cable ends secured to ones to the opposite ends of said rocker and the others to the ends of said arms rigid with the central portion of one of said resilient rods, said cables being adapted to lower the inclination of the optical axes of said headlamp in relation to said frame, the one when the level of the front set of wheels is lowered, and vice-versa, the other when the level of said rear set of wheels rises in relation to said frame and vice-versa, the thrust transmitted through said cables being exerted in the same direction on said rocker, and a spring constantly urging said rocker in the opposite direction.

References Cited

UNITED STATES PATENTS

| | | | |
|---|---|---|---|
| 2,049,802 | 8/1936 | Hamm | 240—62.3 |
| 2,984,737 | 5/1961 | Marcellus | 240—7.1 |
| 3,171,603 | 3/1965 | Eriksson | 240—62.3 X |
| 3,177,355 | 4/1965 | Trowbridge | 240—62.3 X |
| 3,316,397 | 4/1967 | Yssel | 240—7.1 |

FOREIGN PATENTS

| | | |
|---|---|---|
| 953,043 | 11/1956 | Germany. |

NORTON ANSHER, *Primary Examiner.*

D. L. JACOBSON, J. F. PETERS, *Assistant Examiners.*